Jan. 16, 1934.                H. JUNKERS                1,943,974
                   CONTROL MECHANISM FOR FUEL PUMPS
                     Filed July 20, 1929        2 Sheets-Sheet 1
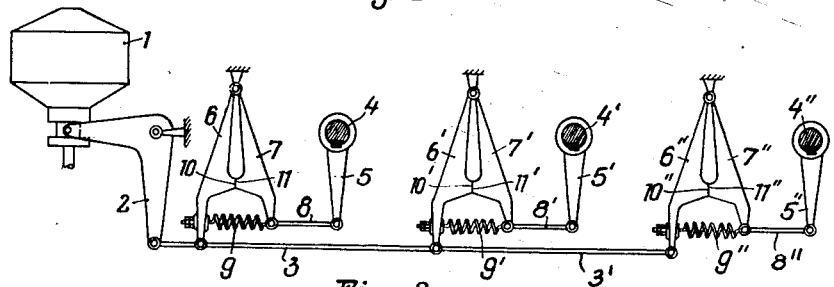
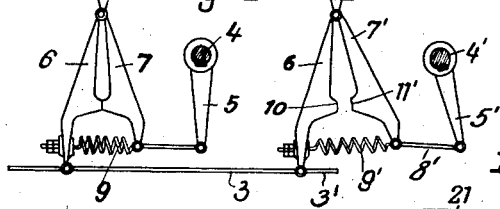 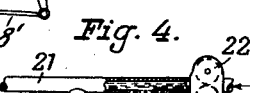
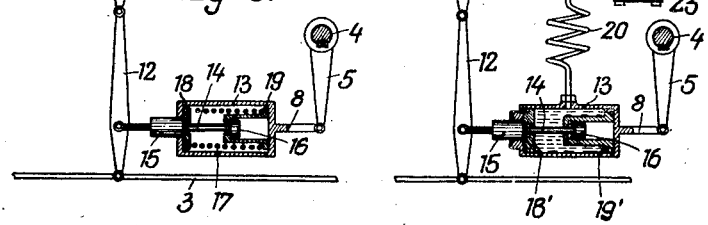
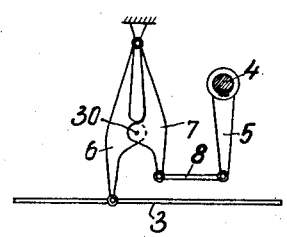 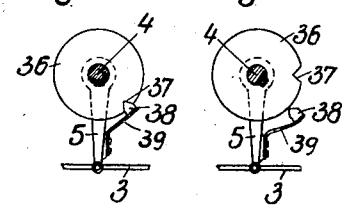
Inventor:
Hugo Junkers
by Keinhören
    Atty.

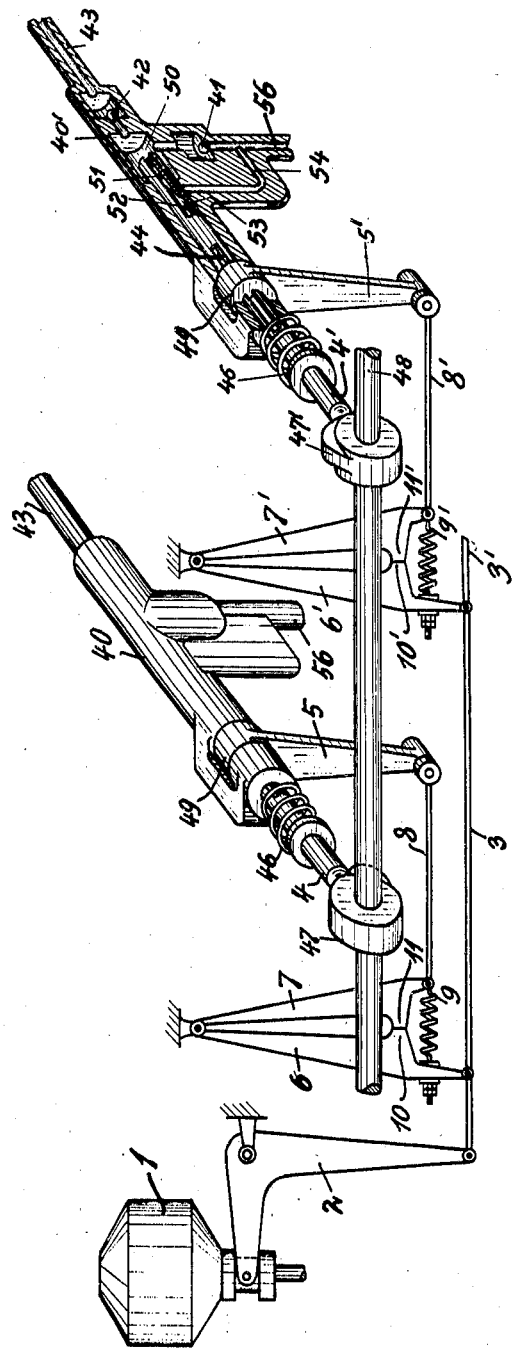

Patented Jan. 16, 1934

1,943,974

UNITED STATES PATENT OFFICE

1,943,974

CONTROL MECHANISM FOR FUEL PUMPS

Hugo Junkers, Dessau, Germany

Application July 20, 1929, Serial No. 379,740, and in Germany July 27, 1928

7 Claims. (Cl. 103—37)

My invention relates to control mechanism for the fuel pumps of internal combustion engines in which the controlling members of the several pumps are connected with each other and are operated in unison by a governor. It is an object of my invention to provide means for preventing interference with the control of the other pumps when the control member of one of them becomes inoperative. To this end I provide a first member which is positively connected with the governor, a second or mating member by which the movement of the first member is transmitted to the control of one of the pumps, and a yielding connection between the two members.

With the positive control, as heretofore provided, jamming or some other trouble with any one of the pump controls renders the whole controlling mechanism inoperative, which is undesirable under any conditions and may even cause racing and very serious trouble if the control mechanism is accidentally blocked just when the governor has set the control for full load. The governor is not able to return the pumps into a position corresponding to lower load when the load on the engine is reduced or becomes nil, and the engine will then start racing.

Interference with the function of the governor by a pump control which has failed is, according to my invention, under any conditions restricted so as not to permit racing, and my control mechanism may even be so designed that the controls of the other pumps are operated, as they would be under normal conditions, notwithstanding the failure of one of them.

My control mechanism may be connected with pumps of any type, for instance with pumps in which the plungers are operated by cams against the action of springs and in which trouble may result from excessive friction of the plunger at the cylinder walls so that the control of a pump may become blocked by seizing of the plunger. Pumps the delivery of which is regulated by rotating the plunger about its own axis, are old and are described for instance in U. S. Patent 1,706,785, dated March 26, 1929. Obviously, in this instance, the plungers themselves are the regulating means and when a plunger becomes seized in its cylinder, the pump becomes inactive. My invention has particular reference to this type of regulating means, that is, means which are so designed that the pump becomes inactive and ceases to deliver when the regulating means becomes inactive. Pumps having plungers adapted to be rotated about their own axes as the combined regulating and delivering means of the pump are only referred to by way of example, and I am not limited to this particular type of regulating means which cause ceasing of the delivery when the regulating means becomes inactive.

The yielding connection aforesaid may be designed in any suitable manner. It may for instance, be a spring, a compressible or extrudible medium such as a gas or liquid, a breaking link which is destroyed, when the control becomes inoperative, so that the connection of the governor with the control member concerned is interrupted altogether, or it may be designed as a clutch the two parts of which are disconnected when the power limit is overstepped.

In the drawings affixed to this specification and forming part thereof various control mechanisms embodying my invention and details of such mechanism are illustrated diagrammatically by way of example.

In the drawings

Fig. 1 is a diagrammatic elevation of a control mechanism in which springs constitute the yielding connection, Fig. 2 illustrates the operation of one of the springs when one of the pump controls becomes inoperative, Fig. 3 is a sectional elevation of a control which is so designed as not to interfere with the possibility of controlling the still operative pump controls as under normal conditions notwithstanding failure of one of their controls, Fig. 4 illustrates a modification of the control shown in Fig. 3, Fig. 5 illustrates a connection with a breaking link, Figs. 6 and 7 illustrate a clutch as the yielding connection, in two positions, Fig. 8 is a perspective illustration, partly in section, showing two of the regulated units illustrated in Fig. 1.

Referring now to the drawings, and first to Figs. 1 and 2, 1 is a governor, 2 is a bell-crank lever which at one end is engaged by the sleeve of the governor and at its other end is connected with a rod 3 and an extension 3', 4 4' and 4" are rocking shafts which are connected with the controlling members of the pumps, two of which are illustrated in Fig. 8, or may themselves be controlling members, for instance rotary valves or plungers as shown in Fig. 8, 5 5' and 5" are rocking levers on the several shafts 4, 4' and 4", 6 6' and 6" are rocking members which are pivoted at one end to a stationary bracket or the like, and linked to the rod 3 or its extension 3' at the other end, 10, 10' and 10" are abutments on each rocking member 6, 6' and 6", respectively, and 11 11' and 11" are corresponding abutments on mating rocking members 7 7' and 7" which members are fulcrumed about the same pivot as the first rocking members 6, 6' and 6" but are connected with the rocking levers 5, 5' and 5" by rods 8, 8' and 8", and 9, 9' and 9" are springs connecting each pair of rocking members.

If desired the abutments 10, 11 etc. may be made adjustable. The springs 9 etc. tend to hold them engaged and the tension of the springs is preferably such that its length will not be varied under the normal resistance of the controlling members of the pumps. Under normal conditions, consequently, the abutments 10, 11, etc. are in permanent engagement and the rocking members 6, 7, etc. with the springs 9 etc., operate in the manner of a rigid part, transmitting the movement of the rod 3 and the extension 3' to the shafts 4 etc. as it is imparted to the rod by the governor 1.

In each pair of rocking members, the second or mating member, for instance 7 in the first pair, may be dispensed with and replaced by the rocking lever 5 on the corresponding shaft 4, this lever being equipped with an abutment such as 11, and connected with the free end of the corresponding spring.

Referring now to Fig. 2, it has been assumed that the control member which cooperates with the second shaft 4' has become inoperative at the moment when the governor 1 is in the position corresponding to full load. If the governor were rigidly connected with the controlling member, as heretofore designed, it could not return to its initial position upon reduction of the load, being interfered with by the inoperative control, and therefore all pump control members would be held in the position corresponding to full load, and the engine would race. This risk is eliminated according to my invention as the governor is able to return the rod 3 and its extension 3' notwithstanding the blocking of the shaft 4', by stretching the spring 9', so that it will reduce the delivery of the pumps which are still operative. If, on the other hand, the pump control becomes inoperative when the governor is in a position corresponding to no load or low load, return of the governor toward full load is prevented by the abutment 11' of the member 7' so that the engine will stop when the load increases, and the trouble will be detected immediately.

Instead of springs as illustrated, other means may be provided, for instance cylinders with pistons in which a given pressure is permanently maintained and the surface of the pistons is so determined that the pressure holds them against a check while the controlling force is normal, but that the pistons are displaced against the pressure when the resistance of the controlling member becomes excessive.

The risk of racing is not eliminated altogether by the means described, particularly in engines having few pumps, as in order to absolutely eliminate the risk, it is necessary that the delivery should be interrupted altogether, for in such cases the full delivery of a single pump is able to cause racing of an engine under no load or small load conditions.

Means such as illustrated in Figs. 3 and 4 may be provided if it is desired to continue the operation of the control mechanism as under normal conditions when one of the control members has become inoperative, so that the governor will be able to regulate the other units for increased delivery when the load on the engine increases if a unit has failed at a position of the governor which corresponds to low or zero load, instead of stopping the engine, as in the example described above.

Referring first to Fig. 3, 12 is a rocking lever to which the rod 3 is linked, and means are provided for connecting this rocking lever with the rocking lever 5 on the shaft 4 so that the rod 3 may move in any direction with respect to the rocking lever 5 when the shaft 4 has become blocked, while, with the shaft 4 in normal condition, the power of the governor is transmitted as by the springs 9 in Figs. 1 and 2. 13 is a cylinder which is secured to, or integral with, the connecting rod 8 to the lever 5 on the shaft 4, 14 is a piston rod in the cylinder 13 which is linked to the rocking lever 12, 15 and 16 are pistons on the rod, 18 is a perforated washer which is arranged at the end of the cylinder near the rocking lever 12, the piston 15 being adapted to abut against this washer, 16 is a piston at the inner end of the piston rod, 19 is a tubular washer at the end of the cylinder near the rocking lever 5, the piston 16 being fitted to slide in the tube of the washer, the end wall of which is perforated for the admission of the piston rod but serves as an abutment for the piston 16, and 17 is a spring which is inserted between the washer 18 and the flange of the tubular washer 19. The spring 17 has a predetermined initial tension, as the springs 9, Figs. 1 and 2.

In normal operation any displacement imparted to the rod 14 through the medium of the rod 3 and the rocking lever 12 is transmitted to the cylinder 13 through the washer 18 and the spring 17 without compressing the spring, and from the cylinder 13 to the rocking lever 5 on the shaft 4. When the shaft 4 has become blocked, the cylinder 13 becomes stationary and one of the pistons 15 or 16, according to which direction the rod 14 is moving in, engages one of the washers 18, 19 and compresses the spring 17.

Referring now to Fig. 4, the spring 17 is here replaced by a fluid, liquid or gas, and the washers 18 and 19 have been replaced by pistons 18' and 19' which slide in the cylinder 13. Otherwise the cylinder 13 and its accessories are designed and operated as in Fig. 3. 22 is a pump, 21 is a main which constitutes the delivery pipe of the pump, 23 is a relief valve maintaining constant pressure in the delivery pipe, and 20 is a branch pipe connecting the cylinders 13' of the several shafts 4 with the main pipe 21. The operation is the same as described with reference to Fig. 3.

Referring now to Fig. 5, the rocking members 6 and 7 are connected by a shearing pin 30 which at excessive resistance of the shaft 4 is cut through, so that the connection of the rod 3 with the rocking lever 5 is interrupted altogether.

Referring now to Figs. 6 and 7, the rocking lever 5 is free to turn on the shaft 4, 36 is a disk which is keyed on the shaft, 37 is a V-notch in the disk, 38 is a block having inclined faces in conformity with those of the notch 37, and 39 is a spring by which the block 38 is carried on the rocking lever 5. The pressure of the spring 39 is such that under normal conditions, Fig. 6, the rocking movement of the lever 5 is transmitted to the disk 36 and from the disk to the shaft 4, with the block in position in its notch, but that the block 38 will be forced from the notch when the resistance of the controlling member becomes excessive.

Referring now to Fig. 8, 48 is a cam shaft, with cams 47 and 47'. The cam 47 operates a pump 40 which is connected to the first pair of rocking members 6 and 7, and the cam 47 operates a pump 40' which is connected to the second pair of rocking members 6' and 7'. The means for connecting the regulating units to the governor 1 have been described with reference to Figs. 1 and 2. The shafts 4 and 4' in the system illustrated in Fig. 8 are the plungers of the pumps 40 and 40', respectively.

As shown for the pump 40', each pump cylinder 50 is equipped with a suction pipe 56, a suction valve 41 and a delivery valve 42. Each pump is connected to the injection nozzle of the engine, not shown, by a delivery pipe 43. 46 are springs on the outer ends of the pistons 4 and 4' which tend to hold the pistons engaged with the respective cams 47 and 47'. The rocking levers 5 and 5' are equipped with bosses 49 which engage in grooves 44 of the plungers so that the plungers are rotated when the levers 5 and 5' are rocked, but their reciprocation is not interferred with by the rocking motion of the levers. 51 is a longitudinal groove in the inner end of the plunger which projects into the pump cylinder 50, 52 is a comparatively large recess in the plunger to which the groove 51 is connected, and 53 is an inclined edge bordering one side of the recess 52, and 54 is a by-pass which connects the cylinder 50 with the suction pipe 56, and is controlled by the edge 53. By rotating the plungers 4 and 4' through the medium of the rocking levers 5 and 5', their edges 53 will after a shorter or longer portion of the inward stroke uncover the by-pass 54, thereby connecting the by-pass through the recess 52 and groove 51 with the working chamber 50 of the pump. It will appear that by rotating a plunger about its own axis through the medium of the corresponding rocking lever the delivery of its pump is regulated by returning the full amount of fuel which has been drawn into the pump, to the suction pipe, or a certain percentage thereof, or by returning none of it, that is, delivering the full amount to the injection nozzle of the engine.

There is no positive connection between a plunger and its cam, the plunger being held in contact with the corresponding cam only by the pressure of the spring 46, and therefore, if a plunger seizes in its cylinder, it will stick at the inner or rear end of its stroke, as the spring 46 is not able to return it into engagement with the cam, and therefore the delivery of the pump ceases altogether.

This is the type of regulating means to which my invention relates but obviously I am not limited to the particular case of a pump the delivery of which is regulated by rotating its plunger about its axis.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. A regulator for a plurality of fuel-injection pumps for internal combustion engines comprising a control, means for varying the delivery of each pump, primary members positively connected to said control, secondary members operatively connected to said delivery-varying means, means effecting a positive connection of said primary and secondary members in one direction, and yielding means for connecting said primary and secondary members in the opposite direction.

2. A regulator for a plurality of fuel-injection pumps for internal combustion engines comprising a control, means for varying the delivery of each pump, primary members positively connected to said control, secondary members operatively connected to said delivery-varying means, means effecting a positive connection of said primary and secondary members in one direction, and yielding means under initial tension for connecting said primary and secondary members in the opposite direction.

3. A regulator for a plurality of fuel-injection pumps for internal combustion engines comprising a control, means for varying the delivery of each pump, said means being so designed that the delivery of any pump ceases when its respective varying means becomes inactive, primary members operatively connected to said control, secondary members operatively connected to said delivery-varying means, and yielding means under initial tension for connecting said primary and secondary members to permit the delivery of each of the remaining pumps to be made zero when the varying means for any pump becomes inactive.

4. A regulator for a plurality of fuel-injection pumps for internal combustion engines comprising a control, a piston in each pump adapted to be rotated about its axis for varying the delivery of the pump, rotary cams for operating said pistons, means for rocking each piston about its axis, primary members connected to said control, secondary members connected to said rocking means, and yielding means under initial tension for connecting said primary and secondary members to permit the delivery of each of the remaining pumps to be made zero when the rocking means for any piston becomes inactive.

5. A regulator for a plurality of fuel-injection pumps for internal combustion engines comprising a control, means for varying the delivery of each pump, said means being so designed that the delivery of each pump ceases when said varying means becomes inactive, primary members positively connected to said control, secondary members operatively connected to said delivery-varying means, means effecting a positive connection of said primary and secondary members in one direction and yielding means for connecting said primary and secondary members in the opposite direction.

6. A regulator for a plurality of fuel-injection pumps for internal combustion engines comprising a control, means for varying the delivery of each pump, said means being so designed that the delivery of each pump ceases when said varying means becomes inactive, primary members positively connected to said control, secondary members operatively connected to said delivery-varying means, means effecting a positive connection of said primary and secondary members in one direction, and yielding means under initial tension for connecting said primary and secondary members in the opposite direction.

7. A regulator for a plurality of fuel-injection pumps for internal combustion engines comprising a control, a piston in each pump adapted to be rotated about its axis for varying the delivery of the pump, rotary cams for operating said pistons, means for rocking each piston about its axis, primary members positively connected to said control, secondary members positively connected to said rocking means, means effecting a positive connection of said primary and secondary members in one direction, and yielding means adapted to be deformed when stressed beyond a given limit for connecting said primary and secondary members in the opposite direction.

HUGO JUNKERS.